(12) United States Patent
Docter et al.

(10) Patent No.: US 6,330,610 B1
(45) Date of Patent: *Dec. 11, 2001

(54) MULTI-STAGE DATA FILTERING SYSTEM EMPLOYING MULTIPLE FILTERING CRITERIA

(76) Inventors: Eric E. Docter, 1555 Wessex Ave., Los Altos, CA (US) 94024; William D. Hofmann, 1408 Carleton St., Berkeley, CA (US) 94702; Paul E. Hurley, 186 Forest Ave., #5A, Palo Alto, CA (US) 94301

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,389

(22) Filed: Dec. 4, 1997

(51) Int. Cl.[7] ............................. G06F 15/16; G06F 15/177
(52) U.S. Cl. .......................... 709/229; 709/202; 713/153; 713/154; 713/155; 713/201
(58) Field of Search ...................... 707/10, 2, 4; 364/137, 364/716.04, 724.011; 395/187.07, 200.59; 709/219, 249, 200, 229, 202; 713/200, 177, 201, 202, 154, 155, 150, 153, 161, 160, 162, 182; 705/55, 56

(56) References Cited

U.S. PATENT DOCUMENTS

| | | | |
|---|---|---|---|
| 5,101,445 | * | 3/1992 | Call et al. ............................. 382/263 |
| 5,187,787 | | 2/1993 | Skeen et al. ......................... 709/314 |
| 5,404,505 | * | 4/1995 | Levinson ................................. 707/10 |

(List continued on next page.)

OTHER PUBLICATIONS

Rusty Russell, Linux 2.4 Packet Filtering HOWTO, May 2000.*
Logicon Message Dissemination System, LMDS 2.2, 1997.*
Protecting Your AS/400.*
Siyan Karanjit, Internet Firewalls and Network Secourity, Second Edition, 95.*
Pat Hensley, et al.; Proposal for an Open Profiling Standard; NOTE–OPS–FrameWork.html; Jun. 2, 1997; Version 1.
Joseph Reagle et al.;General Overview of the P3P Architecture; P3P Architecture Work Group; Oct. 22, 1997.
Pat Hensley, et al.; Implementation of OPS Over HTTP: NOTE–OPS–OverHTTP.html; Jun. 2, 1997; Version 1.
Pat Hensley, et al.; Standard Practices for OPS Systems; NOTE–OPS–Standard Practices.html; Jun. 2, 1997; Version 1.

(List continued on next page.)

Primary Examiner—Mark H. Rinehart
Assistant Examiner—William C. Vaughn, Jr.
(74) Attorney, Agent, or Firm—Blakely, Sokoloff, Taylor & Zafman, LLP (57) ABSTRACT

A data filtering system is provided that filters data in multiple stages. The system provides a first filter criteria to a first device. The first device uses the first filter criteria to generate a first set of filtered data. The system receives the first set of filtered data from the first device and filters the received data based on a second filter criteria, which is different from the first filter criteria. The filtering of the first set of filtered data generates a second set of filtered data. The first filter criteria and the second filter criteria can be included in a profile data set. The profile data set may be associated with a particular data recipient. The first filter criteria contains public profile data and the second filter criteria contains private profile data. The profile data set may contain data elements associated with a particular class of data recipients or a particular data recipient role. The data filtering system can be implemented such that the first device is an untrusted filtering device and the second device is a trusted filtering device.

36 Claims, 10 Drawing Sheets

U.S. PATENT DOCUMENTS

| | | | |
|---|---|---|---|
| 5,493,658 | | 2/1996 | Chiang et al. . |
| 5,530,853 | | 6/1996 | Schell et al. .............................. 707/1 |
| 5,555,376 | * | 9/1996 | Theimer et al. ..................... 709/229 |
| 5,557,798 | | 9/1996 | Skeen et al. ............................ 705/35 |
| 5,596,718 | * | 1/1997 | Boebert et al. ................. 395/187.01 |
| 5,606,668 | * | 2/1997 | Shwed ............................. 395/187.01 |
| 5,608,662 | * | 3/1997 | Large et al. ......................... 708/300 |
| 5,619,648 | | 4/1997 | Canale et al. ........................ 709/206 |
| 5,630,123 | * | 5/1997 | Hogge ..................................... 707/7 |
| 5,701,342 | * | 12/1997 | Anderson et al. ....................... 380/4 |
| 5,740,423 | * | 4/1998 | Logan et al. .......................... 707/10 |
| 5,781,550 | * | 7/1998 | Templin et al. ..................... 370/401 |
| 5,787,253 | * | 7/1998 | McCreery et al. ............. 395/200.61 |
| 5,801,688 | * | 9/1998 | Mead et al. .......................... 345/326 |
| 5,812,124 | * | 9/1998 | Eick et al. ............................ 345/327 |
| 5,815,665 | * | 9/1998 | Teper et al. .......................... 709/229 |
| 5,822,431 | * | 10/1998 | Sprunk ................................. 713/150 |
| 5,826,268 | * | 10/1998 | Schaefer et al. ......................... 707/9 |
| 5,842,040 | * | 11/1998 | Hughes et al. ....................... 395/831 |
| 5,864,683 | * | 1/1999 | Boebert et al. ...................... 709/249 |
| 5,867,651 | * | 2/1999 | Dan et al. ............................ 709/203 |
| 5,867,799 | * | 2/1999 | Lang et al. .............................. 707/1 |
| 5,872,847 | * | 2/1999 | Boyle et al. ......................... 713/151 |
| 5,884,025 | * | 3/1999 | Baehr et al. ......................... 713/201 |
| 5,884,033 | * | 3/1999 | Duvall et al. ........................ 709/206 |
| 5,887,133 | * | 2/1999 | Brown et al. ........................ 709/200 |
| 5,893,091 | * | 4/1999 | Hunt et al. .............................. 707/3 |
| 5,898,830 | * | 4/1999 | Wesinger, Jr. et al. .............. 713/201 |
| 5,901,287 | * | 5/1999 | Bull et al. ............................ 709/218 |
| 5,905,863 | * | 5/1999 | Knowles et al. ..................... 709/206 |
| 5,910,987 | * | 6/1999 | Ginter et al. ........................... 380/24 |
| 5,937,401 | * | 10/1999 | Hillegas .................................. 707/2 |
| 5,951,638 | * | 9/1999 | Hoss et al. ........................... 709/206 |
| 5,968,176 | * | 10/1999 | Nessett et al. ....................... 713/201 |
| 5,978,475 | * | 11/1999 | Schneier et al. ..................... 713/177 |
| 5,987,471 | * | 11/1999 | Bodine et al. ....................... 707/103 |
| 6,005,565 | * | 12/1999 | Legall et al. ......................... 345/327 |
| 6,009,422 | * | 12/1999 | Ciccarelli ................................ 707/4 |
| 6,021,433 | * | 2/2000 | Payne et al. ......................... 709/219 |
| 6,029,161 | * | 2/2000 | Lang et al. .............................. 707/1 |
| 6,029,165 | * | 9/1998 | Gable ...................................... 707/3 |
| 6,067,569 | * | 5/2000 | Khaki et al. ......................... 709/224 |
| 6,072,942 | * | 6/2000 | Stockwell et al. .................. 709/206 |
| 6,101,531 | | 8/2000 | Eggleston et al. ................... 709/206 |
| 6,105,027 | * | 8/2000 | Schneider et al. ...................... 707/9 |
| 6,105,132 | * | 8/2000 | Fritch et al. ......................... 713/167 |

OTHER PUBLICATIONS

Staff Report: Public Workshop on Consumer Privacy on the Global Information Infrastructure; Dec. 1996.

I/Net Commerce Server 400 (Information); Protecting Your AS/400; 2000.

LOGICON; Logicon Message Dissemination System—LMDS 2.2 System Administrator's Guide: Arlington, VA.

PCT Written Opinion for Patent Application No. 98/25248 dated Sep. 13, 1999.

* cited by examiner

| Attribute | Value | Privacy Characteristics |
|---|---|---|
| Name | John Doe | Public |
| Employer | Acme Corp. | Semi-Private |
| Occupation | Engineer | Semi-Private |
| Age | 38 | Semi-Private |
| Gender | Male | Public |
| Height | 6-0 | Semi-Private |
| Social Security No. | 123-45-6789 | Private |
| Marital Status | Married | Private |

FIG. 6A

| Attribute | Value |
|---|---|
| Name | John Doe |
| Gender | Male |

FIG. 6B

| Attribute | Value |
|---|---|
| Employer | Acme Corp. |
| Occupation | Engineer |
| Age | 38 |
| Height | 6-0 |
| Social Security No. | 123-45-6789 |
| Marital Status | Married |

| Attribute | Value |
|---|---|
| Name | John Doe |
| Gender | Male |

FIG. 8B

| Attribute | Value |
|---|---|
| Employer | Acme Corp. |
| Occupation | Engineer |
| Age | 38 |
| Height | 6-0 |

FIG. 8C

| Attribute | Value |
|---|---|
| Social Security No. | 123-45-6789 |
| Marital Status | Married |

MULTI-STAGE DATA FILTERING SYSTEM EMPLOYING MULTIPLE FILTERING CRITERIA

FIELD OF THE INVENTION

The present invention relates to a data filtering system. More specifically, the present invention provides a system capable of filtering data in multiple stages, with each stage of filtering using different filtering criteria.

BACKGROUND

The increased use of networks (such as the Internet) and networking technology has increased the quantity of data presented to individuals and organizations on a day-to-day basis. This data may be in the form of advertisements, news articles, and other information from any number of data sources. Although much of this data may be of interest to particular individuals and organizations, a significant portion of the data is generally of little or no value to the recipient. For example, the data may be related to a subject that is of no interest to the recipient or related to a type of product that the recipient does not use and does not intend to purchase.

Existing systems are available for selecting data to be provided to a particular user based on criteria that is supplied actively or passively by the user. These existing systems perform various filtering operations on a server to select the data to be provided to a particular user. Since these filtering operations are performed on a centralized server, the server must contain the necessary filtering criteria to select the data. These existing systems limit the effectiveness of the filtering operation because certain criteria necessary for proper filtering is confidential or private to the user and is not disclosed to the server. Since the server does not have this private information, it cannot adequately filter out all of the irrelevant data. For example, if a user does not indicate their age to the server, then the server cannot filter data that is directed at a particular age group. As a result, the user receives all data regardless of whether the data is relevant to a person in the user's age group.

Since the server is unable to filter data based on private criteria not provided to the server by the user, the user may receive a significant amount of irrelevant data. This irrelevant data is time consuming to review and creates a distraction from the user's normal work or activities. Since many servers that provide data filtering operations may not be trustworthy with respect to private information, many users are unwilling to provide private information to these servers. As a result, the user receives a significant amount of unwanted data.

Other known systems for filtering data perform all filtering operations on a client. These systems provide all data from all sources to the client, which then filters the data based on information provided by the user of the client. This approach significantly increases the amount of data received by the client and increases the bandwidth or transmission time required to transmit the data to the client from the data sources. The increase in data received by the client also increases the local storage requirements.

It is therefore desirable to provide a unified data filtering system capable of filtering out data that is not relevant to a particular user, without compromising the user's privacy.

SUMMARY OF THE INVENTION

The present invention is related to a system for filtering data in multiple stages without exposing private information to untrusted servers. In one embodiment of the invention, a first filter criteria is provided to a first device, which uses the first filter criteria to generate a first set of filtered data. The first set of filtered data is received from the first device and filtered based on a second filter criteria, which is different from the first filter criteria. The filtering of the data received from the first device generates a second set of filtered data.

In a particular embodiment of the invention, the first filter criteria and the second filter criteria are included in a profile data set.

In another embodiment of the invention, the first filter criteria contains public profile data and the second filter criteria contains private profile data.

Embodiments of the invention provide a profile data set that contains elements associated with a particular class of data recipients.

Other embodiments provide a profile data set that contains elements associated with a particular data recipient role.

In an embodiment of the invention, the first device is an untrusted filtering device and the second device is a trusted filtering device.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

The present invention is related to a system capable of filtering data for a particular user (also referred to as a data recipient) without compromising that user's privacy. The invention provides a unified data filtering process such that data filtering is performed in multiple stages, with different filtering criteria used at each stage. In a first stage, data filtering can be performed by a server using non-private filtering criteria. The data that passes through the filter at the first stage continues to another data filter at a second stage. The second stage of filtering may be performed by a client or a more trusted server, thereby allowing filtering criteria containing private information about the user or organization. Any number of filtering stages may be utilized, depending on the number of servers or other devices located between the data source and the data recipient. By limiting private filtering criteria to trusted servers or clients, a significant amount of unwanted data is eliminated without compromising the user's privacy.

Throughout this detailed description of the invention, various embodiments are discussed that include a client coupled to one or more servers. The teachings of the present invention are applicable to any type of device containing a processor or a controller capable of executing instructions. Thus, the clients and servers discussed herein can be any type of computing device, including desktop or laptop computers, personal digital assistants (PDAs), set-top boxes, or devices containing embedded controllers or embedded processors. Further, any type of communication link and communication medium can be used to communicate information between two or more devices.

Particular data filtering procedures are described below that utilize a profile data set to generate filter criteria for servers and clients. However, it will be appreciated that any method or procedure for filtering data can be used with the present invention. Further, any number of filtering parameters or attributes may be used to filter data at any number of data filtering stages. Additionally, the present invention can be used with any type of data (e.g., text, graphics, product updates (such as software updates), or executable instructions) and with data received from any data source or sources.

Figure 1:
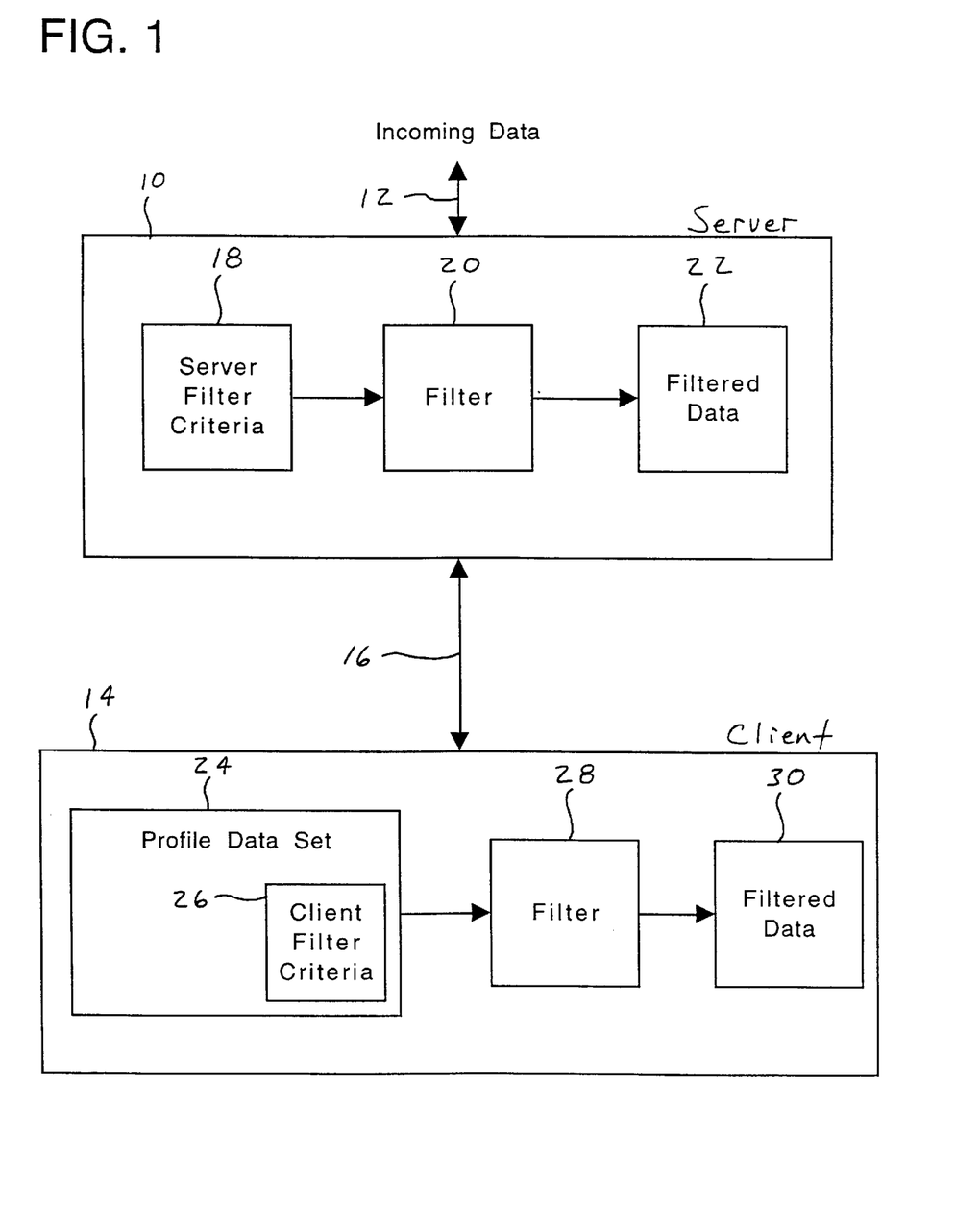
FIG. 1 illustrates an embodiment of a multi-stage data filtering system.

FIG. 1 illustrates an embodiment of a multi-stage data filtering system. A server 10 receives incoming data on a communication link 12. Communication link 12 may be a network communication link or any other link capable of communicating data between two or more devices. Server 10 communicates with a client 14 using a communication link 16. Communication link 16 may be a link through a network or any other link capable of propagating data between server 10 and client 14. Communication links 12 and 16 may use any type of communication medium, such as, but not limited to, wires, fiber optic cables, or wireless communication systems.

Server 10 includes server filter criteria 18, which provides the filtering criteria used by a filter 20 to filter the incoming data. Server 10 may be an untrusted server with which users are unwilling to share private information. In this situation, server filter criteria 18 contains public information (i.e., public filtering criteria) that the user is willing to share with the server. Additional details regarding server filter criteria 18 and the operation of filter 20 are provided below. Filter 20 generates filtered data 22 as a result of applying server filter criteria 18 to the incoming data. Filtered data 22 is generally a subset of the incoming data received on communication link 12. However, in certain situations, filtered data 22 is a null set of data if filter 20 removes (i.e., filters out) all of the incoming data. In other situations, all incoming data may pass through filter 20, such that filtered data 22 contains all incoming data. Upon completion of the filtering operation performed by filter 20, filtered data 22 is provided to client 14 using communication link 16.

Client 14 contains a profile data set 24, which includes client filter criteria 26. In this embodiment, client 14 is trusted and, therefore, client filter criteria 26 may include private information that is not shared with server 10. Profile data set 24 contains all profile data associated with a particular user or organization. This profile data is used to generate server filter criteria 18 and client filter criteria 26. In the embodiment shown in FIG. 1, profile data set 24 contains server filter criteria 18 and client filter criteria 26. In alternate embodiments, profile data set 24 may include filter criteria associated with a particular class of users or a particular role that a user performs. Additional details regarding profile data sets are provided below with respect to FIGS. 4–6.

Client 14 also includes a filter 28 that applies client filter criteria 26 to filtered data 22 received from server 10 on communication link 16. Filter 28 generates a set of filtered data 30, representing the incoming data that meets both server filter criteria 18 and client filter criteria 26. Filtered data 30 is then provided to the user of client 14 for viewing or other processing. To maintain the privacy of the information contained in the profile data set, the results of the filtering process at any particular level of trust are not provided to a device or filtering process having a lower level of trust.

As shown in the filtering system of FIG. 1, profile data set 24 is contained in client 14. Thus, only the data that is public (i.e., not confidential or private) is shared with server 10. The remaining filter criteria are stored on the client and is not exposed to or otherwise provided to the server. Thus, the single profile data set 24 provides a unified system for filtering incoming data on both server 10 and client 14.

Figure 7:
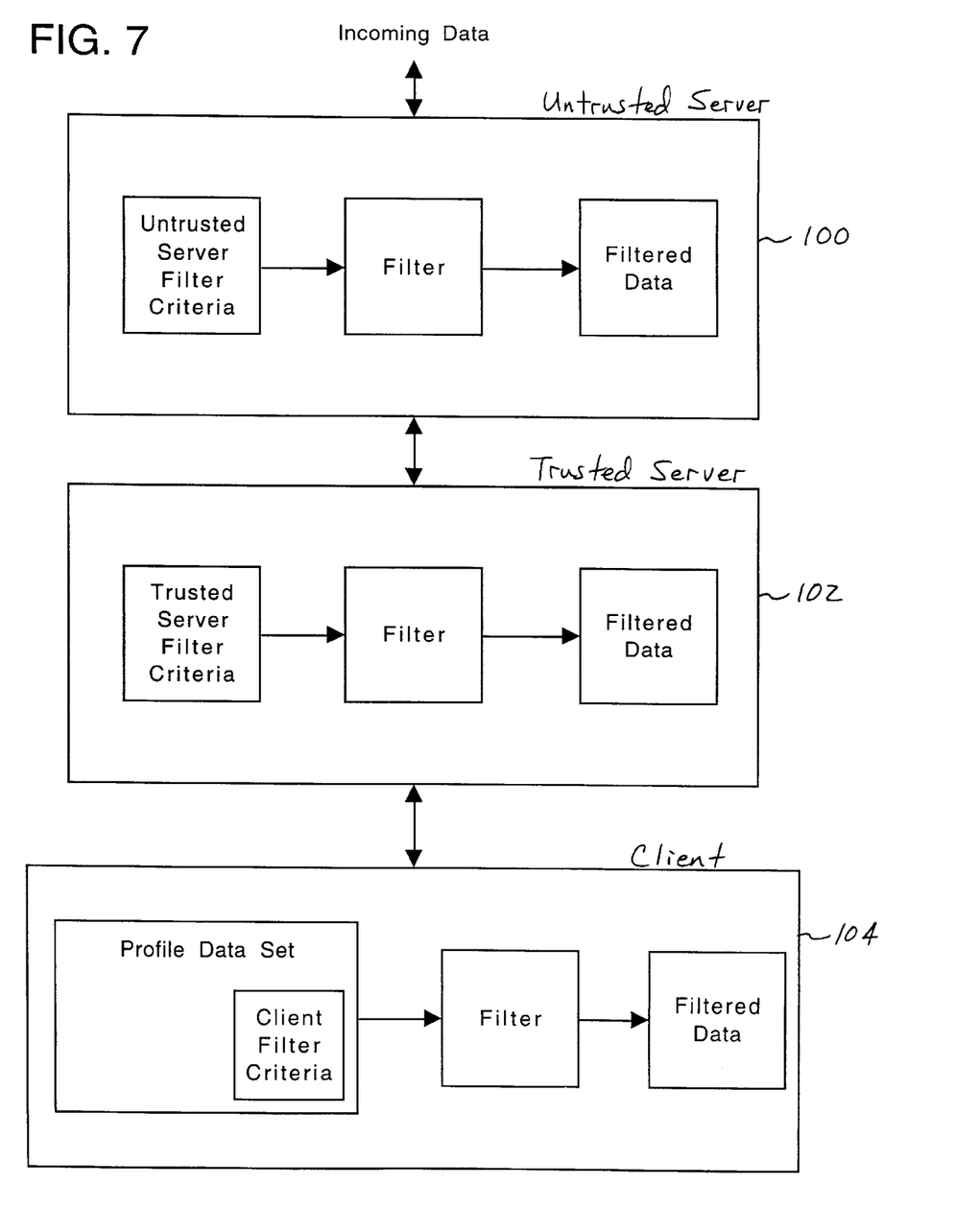
FIG. 7 illustrates another embodiment of a multi-stage data filtering system.

The embodiment of FIG. 1 represents a unified two-stage data filtering system. However, the teachings of the present invention may be applied to a data filtering system having any number of data filtering stages. An example of a unified three-stage data filtering system is illustrated in FIG. 7 and discussed below. Additionally, FIG. 1 shows a single client 14 coupled to server 10. In other embodiments of the invention, a particular server may be coupled to multiple clients and contain separate filter criteria for each client that receives data from the server.

Figure 2:
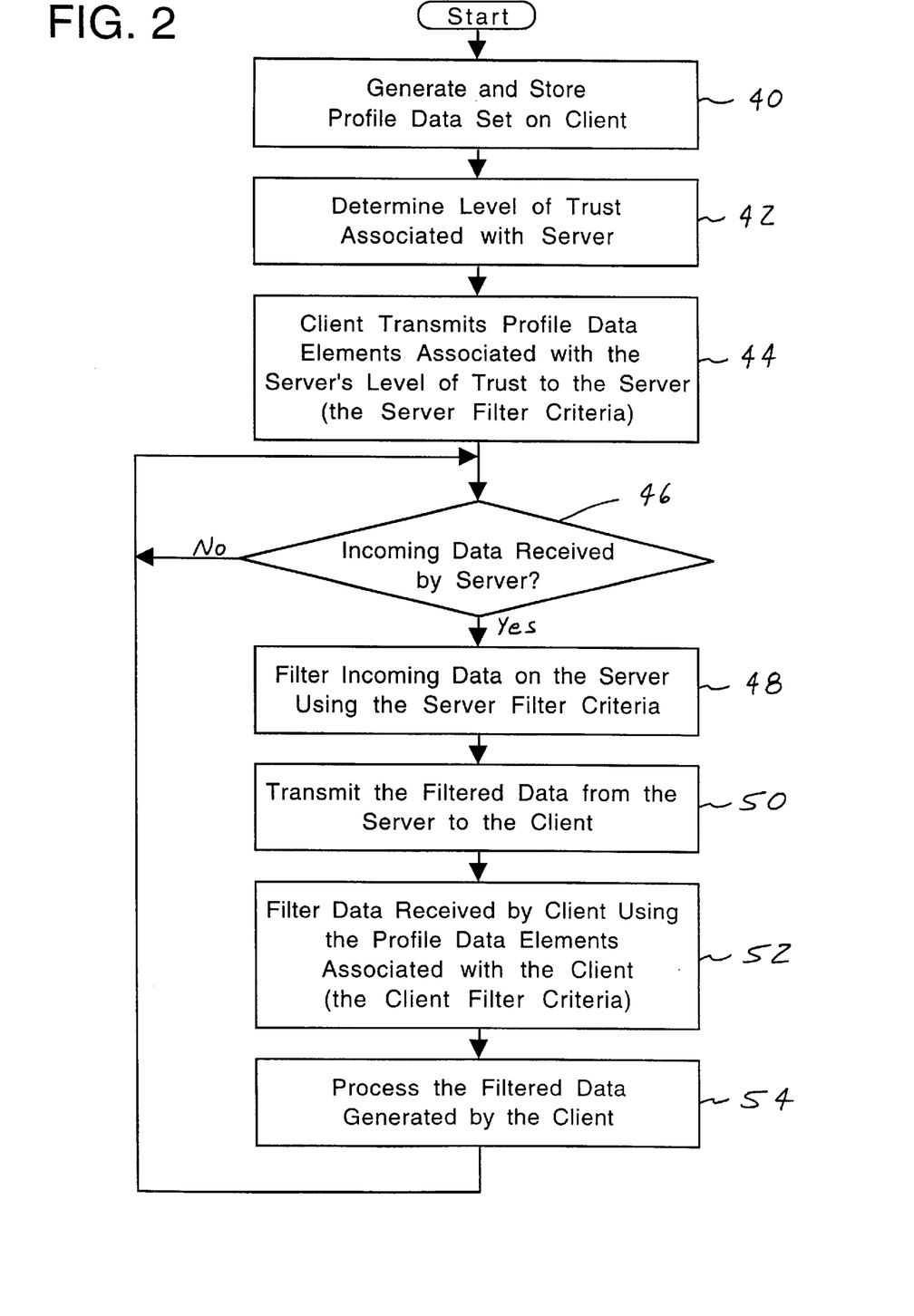
FIG. 2 is a flow diagram illustrating an embodiment of a procedure for performing multi-stage data filtering.

FIG. 2 is a flow diagram illustrating an embodiment of a procedure for performing multi-stage data filtering. The procedure illustrated in FIG. 2 may be used, for example, with the data filtering system illustrated in FIG. 1. At step 40, a profile data set is generated and stored on a client (e.g., client 14 in FIG. 1). Additional details regarding the profile data set are discussed below with reference to FIGS. 4–6. At step 42, the procedure determines the level of trust associated with a server (e.g., server 10 in FIG. 1). For example, a server located inside (i.e., on the corporate side) of a firewall may have a high level of trust and security, but a server located outside the firewall may be untrustworthy and is assigned a low level of trust. The level of trust associated with a particular server determines the type of profile data that is shared with that server for data filtering purposes. If a level of trust is not assigned to a particular server, then the server may be assigned a default level of trust (e.g., an untrusted server).

At step 44 of FIG. 2, the client transmits profile data elements associated with the server's level of trust to the server. These profile data elements are referred to as the server filter criteria. The server filter criteria is stored within the server (e.g., in a register or other data storage mechanism). The server filter criteria may be stored temporarily or permanently. At step 46, the procedure determines whether incoming data was received by the server. If no data was received, the procedure returns to step 46 to repeatedly test for incoming data. As an alternative to repeated testing for incoming data, the procedure may use a "trigger" that causes the procedure to continue to step 48 when incoming data is detected.

At step 48, the procedure filters the incoming data on the server using the server filter criteria. Step 50 transmits the filtered data, if any, from the server to the client. At step 52, the procedure filters data received by the client using the profile data elements associated with the client. These profile data elements are referred to as the client filter criteria. Finally, step 54 processes the filtered data, if any, generated by the client. This processing may include displaying the data to a user or notifying the user of the received data. If either the filtering performed by the server at step 48 or by the client at step 52 eliminates all data, then the procedure terminates without notifying the user.

Figure 3:
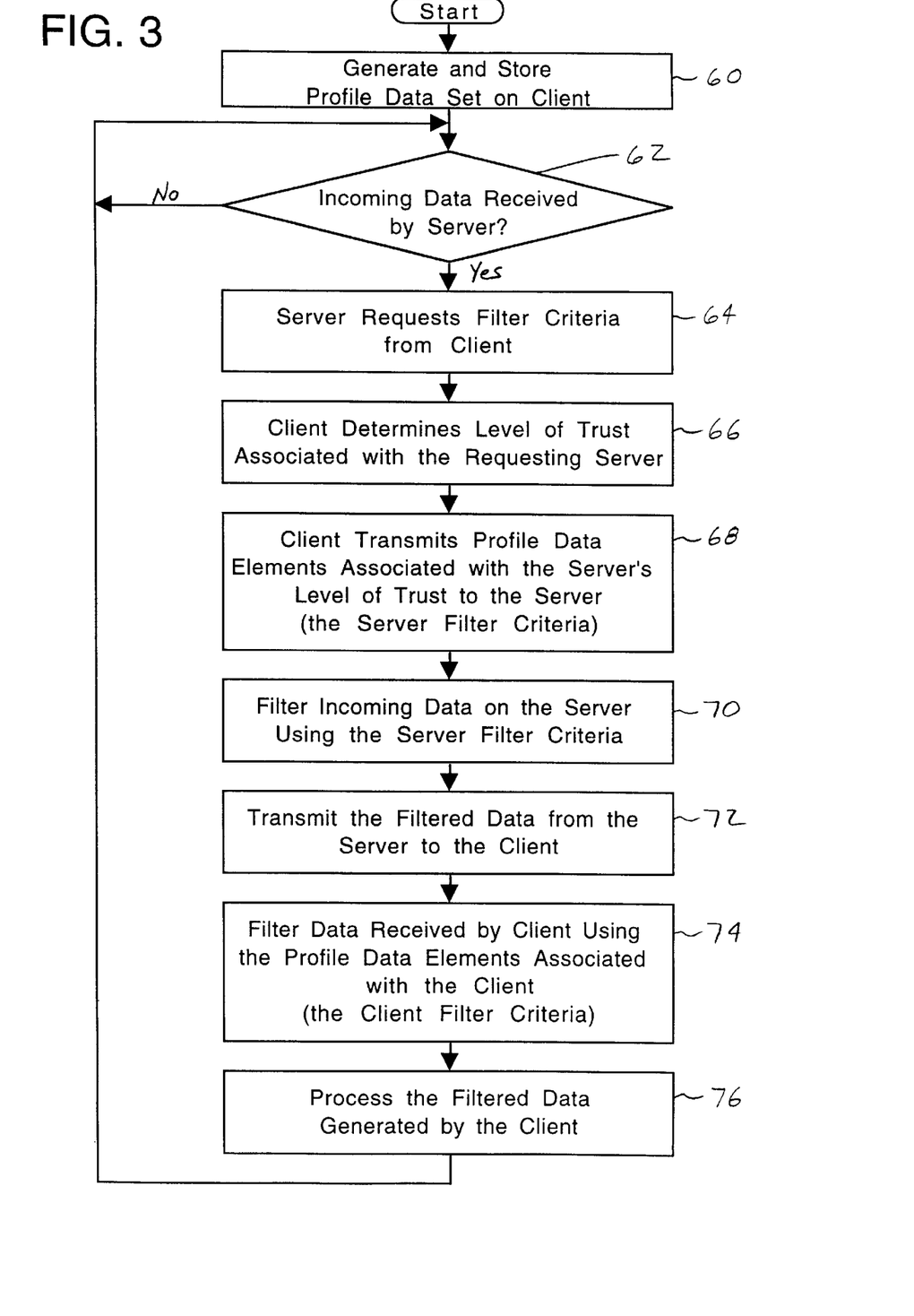
FIG. 3 is a flow diagram illustrating another embodiment of a procedure for performing multi-stage data filtering.

FIG. 3 is a flow diagram illustrating another embodiment of a procedure for performing multi-stage data filtering. The procedure illustrated in FIG. 3 may be used, for example, with the data filtering system illustrated in FIG. 1. The procedure of FIG. 3 is similar to the procedure discussed above with respect to FIG. 2, but transmits profile data elements to the server after the receipt of incoming data instead of prior to the receipt of incoming data. At step 60, a profile data set is generated and stored on the client. Step 62 determines whether incoming data has been received by the server. If incoming data has not been received, then the procedure returns to step 62 to continue testing for incoming data. Alternatively, a "trigger" can be used that causes the procedure to continue to step 64 when incoming data is detected.

When incoming data is received, the procedure continues to step 64, in which the server requests filter criteria from the client. In response to the server's request for filter criteria, the client determines the level of trust associated with the requesting server at step 66. At step 68, the client transmits profile data elements associated with the server's level of trust to the server. These profile data elements are referred to as the server filter criteria. In a particular embodiment of the invention, the server discards the server filter criteria after filtering the received data. In an alternate embodiment of the invention, the server may store the server filter criteria for use with the next incoming data. In this alternate embodiment, the client may update the server with new server filter criteria each time the server filter criteria changes.

At step 70 of FIG. 3, the incoming data is filtered on the server using the server filter criteria. Step 72 transmits the filtered data, if any, from the server to the client. At step 74, the data received by the client is filtered using the profile data elements associated with the client (referred to as the client filter criteria). The filtered data, if any, generated by the client is then processed at step 76. As discussed above, this processing may include displaying the filtered data to the user or notifying the user of the received data. If either the filtering performed by the server at step 70 or by the client at step 74 eliminates all data, then the procedure terminates without notifying the user.

Embodiments of the present invention execute the procedures described above with respect to FIGS. 2 and 3 continually (e.g., in a background mode). Therefore, the client and server(s) may exchange filter criteria, filtered data, and other information while the client is executing other applications or procedures.

Figure 4:
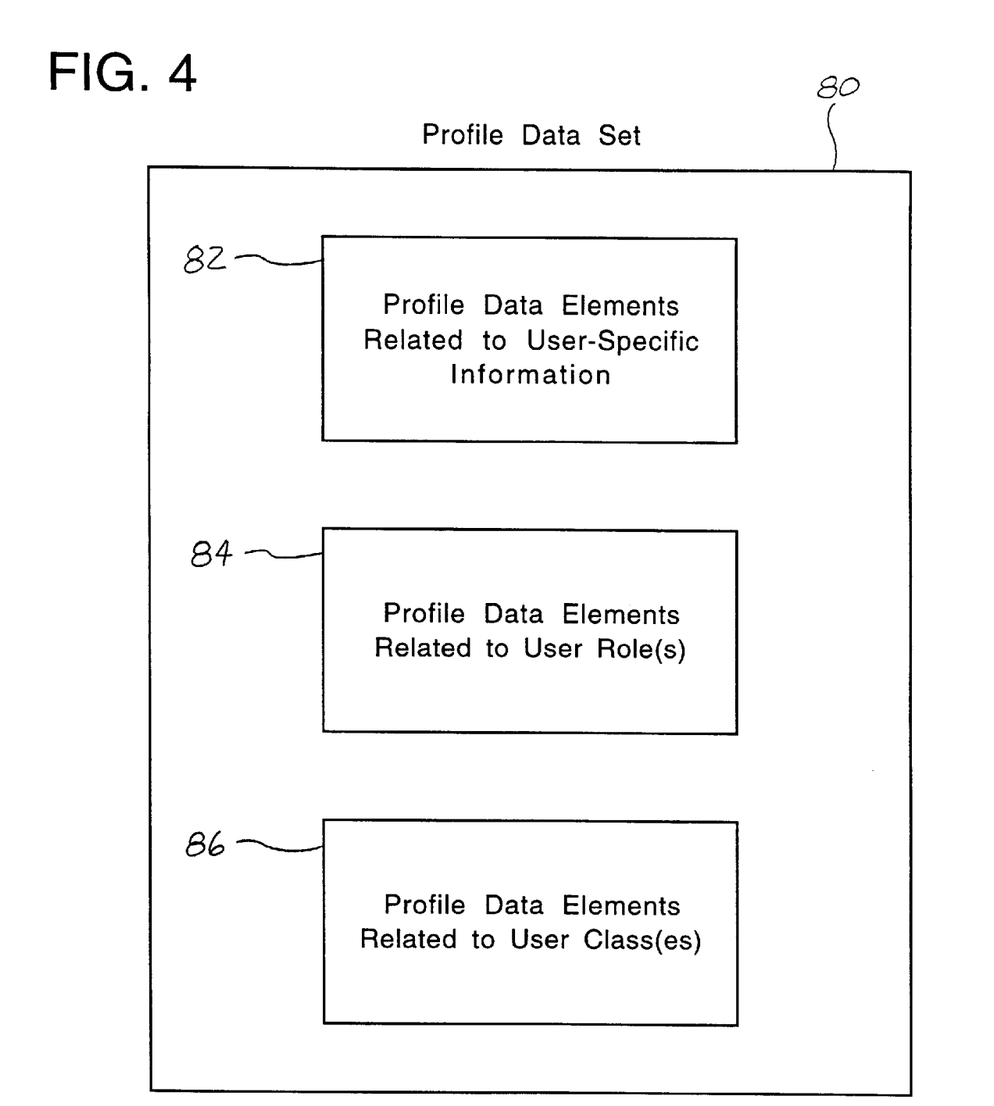
FIG. 4 illustrates an embodiment of a profile data set for use with the present invention.

FIG. 4 illustrates an embodiment of a profile data set 80 for use with the present invention. In one embodiment of the invention, a separate profile data set 80 is provided for each client (or each user). Profile data set 80 includes a set of profile data elements 82 that are related to user-specific information (e.g., age, occupation, or marital status). Profile data set 80 also includes a set of profile data elements 84 that are related to one or more user roles. A user role can be, for example, "professor" or "Vice President of Engineering." Profile data elements 84 related to a user role identify characteristics or attributes associated with that role, rather than an individual person. Therefore, all users performing a particular role may use profile data elements 84 rather than or in addition to entering those attributes along with their user-specific information. Furthermore, the attributes associated with a particular role can be updated once rather than updating each user's specific information. If a particular user performs multiple roles, then that user's profile data set 80 will contain profile data elements related to all of the roles performed by the user.

Profile data set 80 further includes a set of profile data elements 86 that are related to one or more user classes. A user class can be, for example, "marketing" or "engineers." Profile data elements 86 related to a user class identify characteristics or attributes associated with a class of users. Therefore, all users that are members of a particular class can use profile data elements 86 rather than entering those attributes along with their user-specific information. Additionally, the attributes associated with a particular class can be updated once rather than updating each member's specific information. If a particular user is a member of multiple classes, then that user's profile data set 80 will contain profile data elements related to all of the classes of which the user is a member. Additionally, a particular user may override the value associated with an attribute associated with a role or a class. For example, a role "Software Engineering Manager" may have an attribute "job level" with a value "grade 1." If a particular user performing the role of Software Engineering Manager has a job level "grade 2," that user's profile data set will contain an entry for the "job level"—"grade 2" pair that overrides the value provided by the role. Thus, the values associated with role or class attributes may operate as default values that can be changed by a user's profile data set.

As shown in FIG. 4, profile data elements 84 related to user roles and profile data elements 86 related to user classes are stored within profile data set 80. In alternative embodiments of the invention, a pointer or similar mechanism is provided in profile data set 80 that identifies a centralized storage location for the profile data elements related to user roles or user classes. The use of profile data elements related to user roles and user classes is optional. In alternative embodiments of the invention, profile data set 80 may include only profile data elements 82 related to user-specific information.

Figure 5:
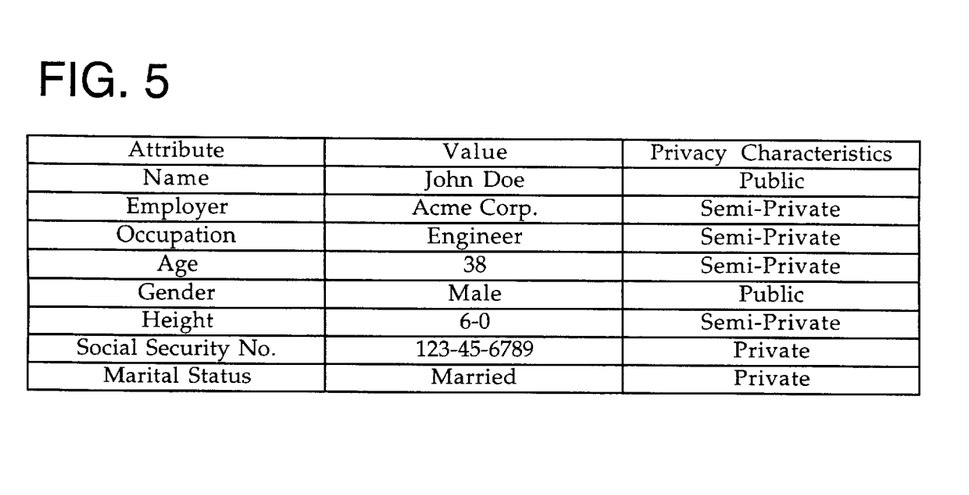
FIG. 5 illustrates exemplary profile data elements related to user-specific information.

FIG. 5 illustrates exemplary profile data elements related to user-specific information (e.g., profile data elements 82 in FIG. 4). The data elements shown in FIG. 5 are arranged into a table format for purposes of illustration. However, the actual data elements may be stored in any configuration using any data structure. The data elements in FIG. 5 include several attribute-value pairs (i.e., a value associated with each attribute). Additionally, a privacy characteristic is associated with each attribute-value pair. For example, the attribute "name" has a value "John Doe" and an associated privacy characteristic "Public." Thus, the user's name is John Doe and the user has made their name public. Public attributes are provided to all servers (whether the server is considered trustworthy or untrustworthy). The employer attribute has a value "Acme Corp." and has an associated privacy characteristic "Semi-Private." A "Semi-Private" privacy characteristic indicates that the attribute is only provided to trustworthy servers (i.e., not provided to untrustworthy servers). Trustworthy servers may be those servers located inside a corporate firewall and untrustworthy servers may be those servers located outside the corporate firewall. A third privacy characteristic, "Private," indicates that the attribute is only provided to clients, and is not provided to any server, whether trusted or untrusted. The example of FIG. 5 contains three different levels of privacy (Public, Semi-Private, and Private). However, in alternate embodiments of the invention, any number of privacy levels may be provided. As discussed in greater detail below, the number of privacy levels does not necessarily equal the number of filtering stages.

By using the profile data elements discussed above and assigning privacy characteristics to each attribute-value pair, the user is able to make an informed tradeoff between the privacy of the profile data and the bandwidth and local storage requirements. For example, if the user has a strong privacy interest, then only a few of the attribute-value pairs may be assigned a "Public" privacy characteristic. In this example, less profile data is exposed to untrusted servers, so additional data is received and processed by the client. In another situation, if the user desires a reduction in bandwidth and local storage requirements, many of the attribute-value pairs may be assigned a "Public" privacy characteristic. In this situation, more profile data is exposed to untrusted servers, but less data is received and stored by the client.

The privacy characteristics associated with a particular attribute-value pair can be determined by the user or the data provider. A default privacy characteristic may be provided for some or all of the attribute-value pairs. For example, a default privacy characteristic of "Private" may be associated with all attribute-value pairs to avoid exposing any private information about the user unless the user specifically changes the default setting.

Embodiments of the invention allow users to further limit the distribution of attribute-value pairs to particular types of servers. For example, a user of a particular brand of computer may only want the "Model Number" attribute to be provided to servers associated with the manufacturer of the computer. Thus, the "Model Number" may have a privacy characteristic of "Public", but the attribute-value pair is only distributed to servers associated with the particular manufacturer of the computer. The distribution of any attribute-value pair can be limited, regardless of the privacy characteristic. Additionally, a user may deactivate a particular attribute-value pair such that the attribute-value pair is not distributed to any server or client. The attribute-value pair remains deactivated until reactivated by the user. This deactivation provides a temporary way for a user to prevent filtering based on a particular attribute-value pair without permanently deleting the information from the profile data set.

Figure 6A:
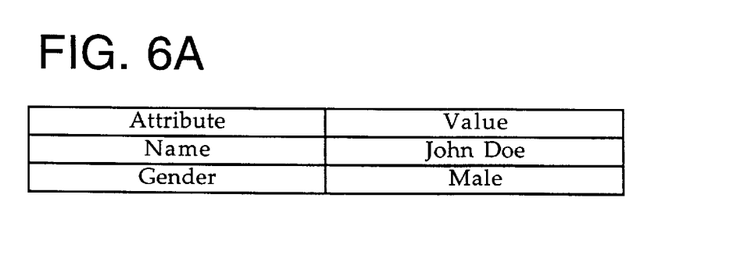
FIGS. 6A and 6B illustrate exemplary server filter criteria and client filter criteria generated from the profile data elements shown in FIG. 5.
Figure 6B:
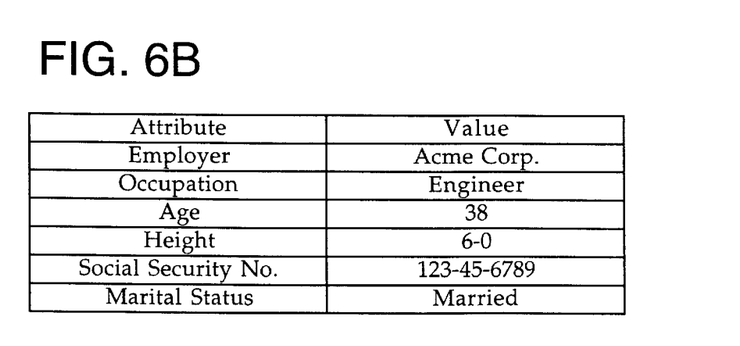

FIGS. 6A and 6B illustrate exemplary server filter criteria and client filter criteria, respectively, generated from the profile data elements shown in FIG. 5. The server filter criteria shown in FIG. 6A contains two attribute-value pairs corresponding to the two "Public" entries shown in FIG. 5. The server filter criteria shown in FIG. 6A does not include the privacy characteristics. The privacy characteristics are used to determine which servers or clients will receive a particular attribute-value pair. However, the privacy characteristics are not transmitted along with the filter criteria.

Using the exemplary filter criteria shown in FIG. 6A, a server is able to filter incoming data. For example, if the server receives incoming data (such as an advertisement or news article) targeted to male computer users over the age of 40, the server filter will allow the data to pass to the next data filtering stage because the server filter criteria for John Doe identifies that John Doe is male. Although the next data filtering stage will reject the data because John Doe is not over 40, the server is unaware of John Doe's age and cannot filter the data based on that attribute. Using the example filter criteria shown in FIG. 6A, the server is only capable of filtering incoming data based on the user's name and gender. If the user changes the privacy characteristic associated with attribute "Age" to "Public," then the server's filter criteria will include the attribute-value pair "Age—38". In this situation, the server will filter out the incoming data based on John Doe's age.

FIG. 6B contains six attribute-value pairs corresponding to the "Semi-Private" and "Private" entries shown in FIG. 5. In this example, two filtering stages are used, but three levels of privacy characteristics are provided. Therefore, two of the privacy characteristic levels are combined into a single filtering stage. For this example, "Public" entries are provided in the server filter criteria and "Semi-Private" and "Private" entries are provided in the client filter criteria. In an alternative embodiment, the "Public" and "Semi-Private" entries are provided in the server filter criteria and the "Private" entries are provided in the client filter criteria. Although FIG. 6B illustrates the client filter criteria separately from the profile data elements shown in FIG. 5, embodiments of the invention may read the client filter criteria directly from the profile data elements instead of generating a separate instance of the client filter criteria.

FIGS. 6A and 6B illustrate server filter criteria and client filter criteria having distinct attributes; i.e., no shared attributes. Thus, the server filter criteria and the client filter criteria are completely different from one another. However, in other embodiments of the invention, one or more of the attributes may be contained in two or more filter criteria. For example, the attribute "Age" may be contained in both the server filter criteria and the client filter criteria such that both the server and the client perform data filtering using the "Age" attribute. However, the server filter criteria and the client filter criteria do not generally share all attributes. Any two filter criteria are "different" if at least one data element is different between the two criteria (e.g., a different attribute or a different attribute value).

FIG. 7 illustrates another embodiment of a multi-stage data filtering system. The embodiment of FIG. 7 represents a unified three-stage data filtering system (untrusted server, trusted server, and client). As mentioned above, the teachings of the present invention may be applied to data filtering systems having any number of data filtering stages. The components contained within the servers and the client in FIG. 7 are similar to those discussed above with reference to FIG. 1. Untrusted server 100 receives incoming data from a data source (not shown) and filters the incoming data using an untrusted server filter criteria. The filtered data, if any, is then communicated from untrusted server 100 to trusted server 102. Trusted server 102 filters the received data using a trusted server filter criteria. The filtered data, if any, is then communicated from trusted server 102 to client 104. Client 104 filters the received data using a client filter criteria to generate a final set of filtered data. The filtering process may be terminated at any point if the output of a particular filter removes all data.

Figure 8A:
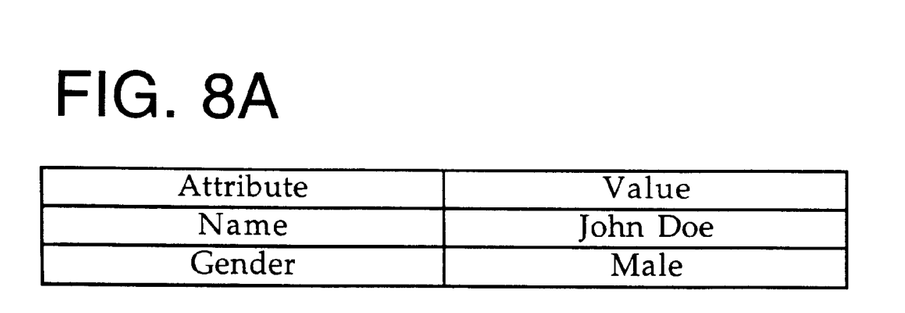
FIGS. 8A–8C illustrate exemplary filter criteria for use in the multi-stage data filtering system shown in FIG. 7.
Figure 8B:
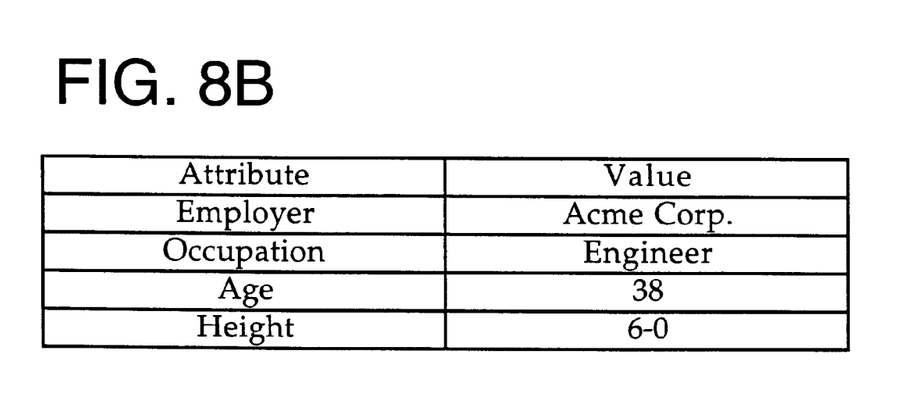
Figure 8C:
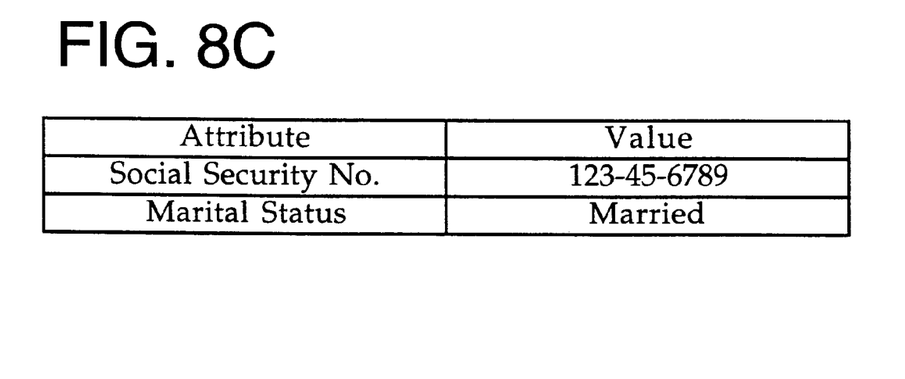

FIGS. 8A–8C illustrate exemplary filter criteria for use in the three-stage data filtering system shown in FIG. 7. FIGS. 8A–8C use the exemplary profile data elements shown in FIG. 5. FIG. 8A illustrates an untrusted server filter criteria (i.e., the attribute-value pairs having a privacy characteristic "Public"). FIG. 8B illustrates a trusted server filter criteria (i.e., the attribute-value pairs having a "Semi-Private" privacy characteristic). FIG. 8C illustrates a client filter criteria (i.e., the attribute-value pairs having a privacy characteristic "Private").

Figure 9:
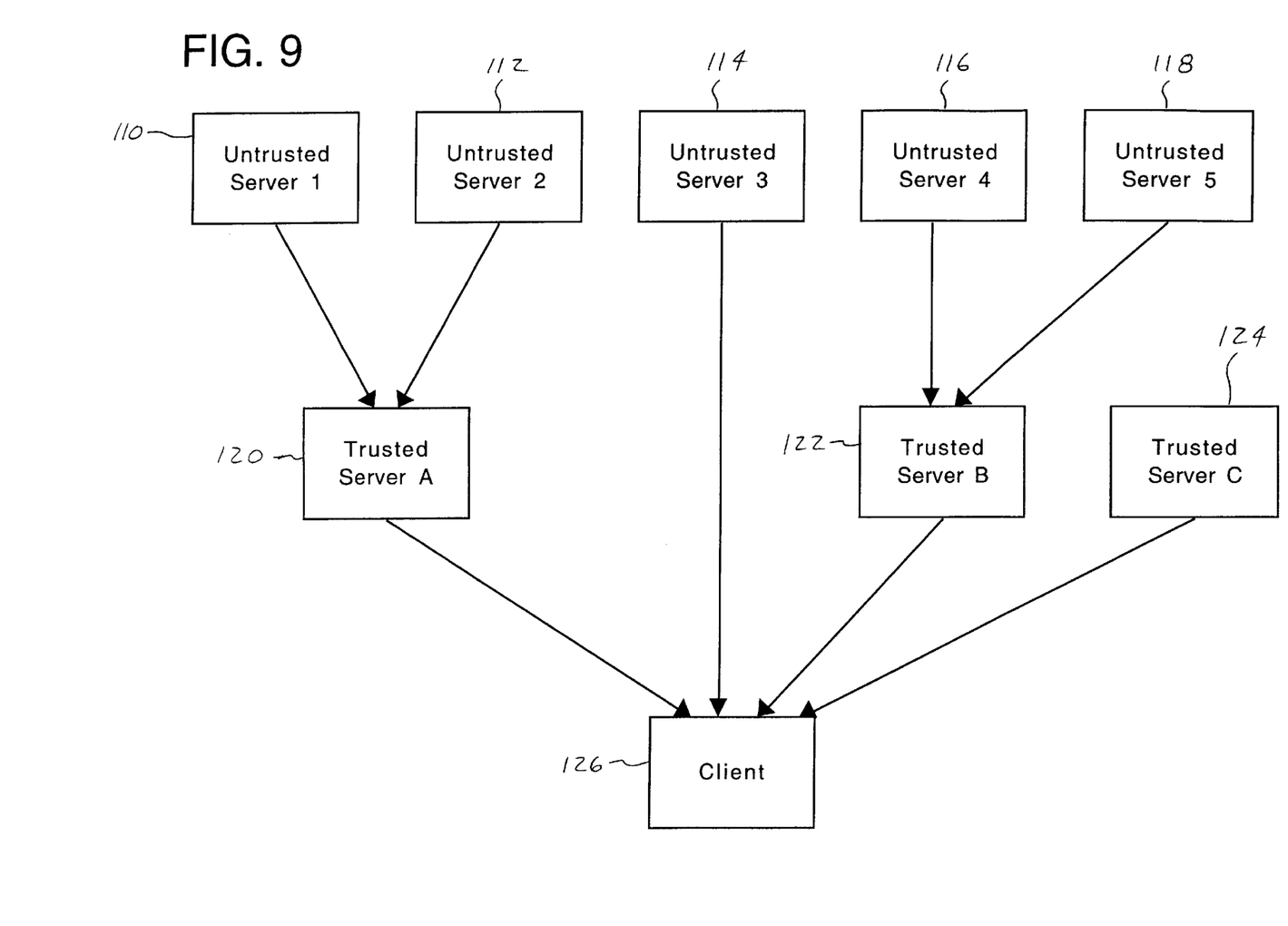
FIG. 9 illustrates another embodiment of a multi-stage data filtering system.

FIG. 9 illustrates another embodiment of a multi-stage data filtering system in which a client 126 receives data from multiple servers 110–124. A single profile data set is stored in client 126. Client 126 distributes various attribute-value pairs to the multiple servers based on the trustworthiness of the server and the privacy characteristics associated with each attribute-value pair. For example, untrusted servers 110 and 112 may receive an untrusted server filter criteria containing only "Public" attribute-value pairs, and trusted server 120 receives a trusted server filter criteria containing "Semi-Private" attribute-value pairs. Additionally, trusted server 124 may receive a trusted server filter criteria containing "Public" and "Semi-Private" attribute-value pairs. Untrusted server 112 may receive "Public" attribute-value pairs, while the "Semi-Private" and "Private" attribute pairs are filtered by client 126. Thus, client 126 may be filtering "Private" attribute-value pairs for some incoming data and filtering "Semi-Private" and "Private" attribute-value pairs for other incoming data.

It is not necessary that data filtering occur at every device through which the data passes. For example, untrusted servers 116 and 118 may receive "Public" attribute-value pairs, and the remaining "Semi-Private" and "Private" attribute-value pairs are filtered by client 126. In this example, the filtered data from untrusted servers 116 and 118 passes through trusted server 122 without any data filtering operation.

Figure 10:
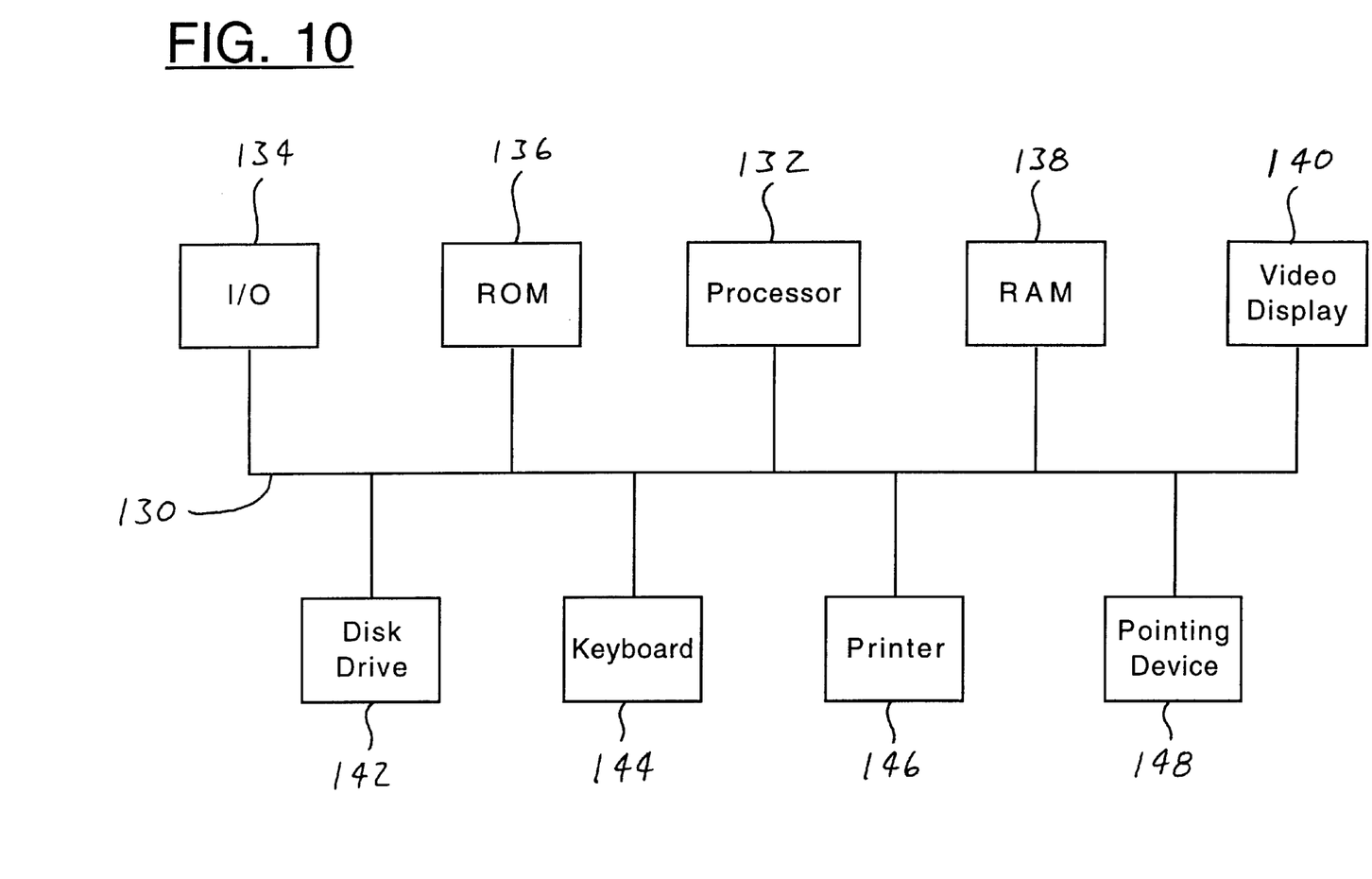
FIG. 10 illustrates an embodiment of a computer system that can be used with the present invention.

FIG. 10 illustrates an embodiment of a computer system that can be used with the present invention (e.g., as a client or a server). The various components shown in FIG. 10 are provided by way of example. Certain components of the computer in FIG. 10 can be deleted from the data filtering system for a particular implementation of the invention. The computer shown in FIG. 10 may be any type of computer including a general purpose computer.

FIG. 10 illustrates a system bus 130 to which various components are coupled. A processor 132 performs the processing tasks required by the computer. Processor 132 may be any type of processing device capable of implementing the steps necessary to perform the data filtering operations discussed above. An input/output (I/O) device 134 is coupled to bus 130 and provides a mechanism for communicating with other devices coupled to the computer. A read-only memory (ROM) 136 and a random access memory (RAM) 138 are coupled to bus 130 and provide a storage mechanism for various data and information used by the computer. Although ROM 136 and RAM 138 are shown coupled to bus 130, in alternate embodiments, ROM 136 and RAM 138 are coupled directly to processor 132 or coupled to a dedicated memory bus (not shown).

A video display 140 is coupled to bus 130 and displays various information and data to the user of the computer. A disk drive 142 is coupled to bus 130 and provides for the long-term mass storage of information. Disk drive 142 may be used to store various profile data sets and other data generated by and used by the data filtering system. A keyboard 144 and pointing device 148 are also coupled to bus 130 and provide mechanisms for entering information and commands to the computer. A printer 146 is coupled to bus 130 and is capable of creating a hard-copy of information generated by or used by the computer.

Figure 11:
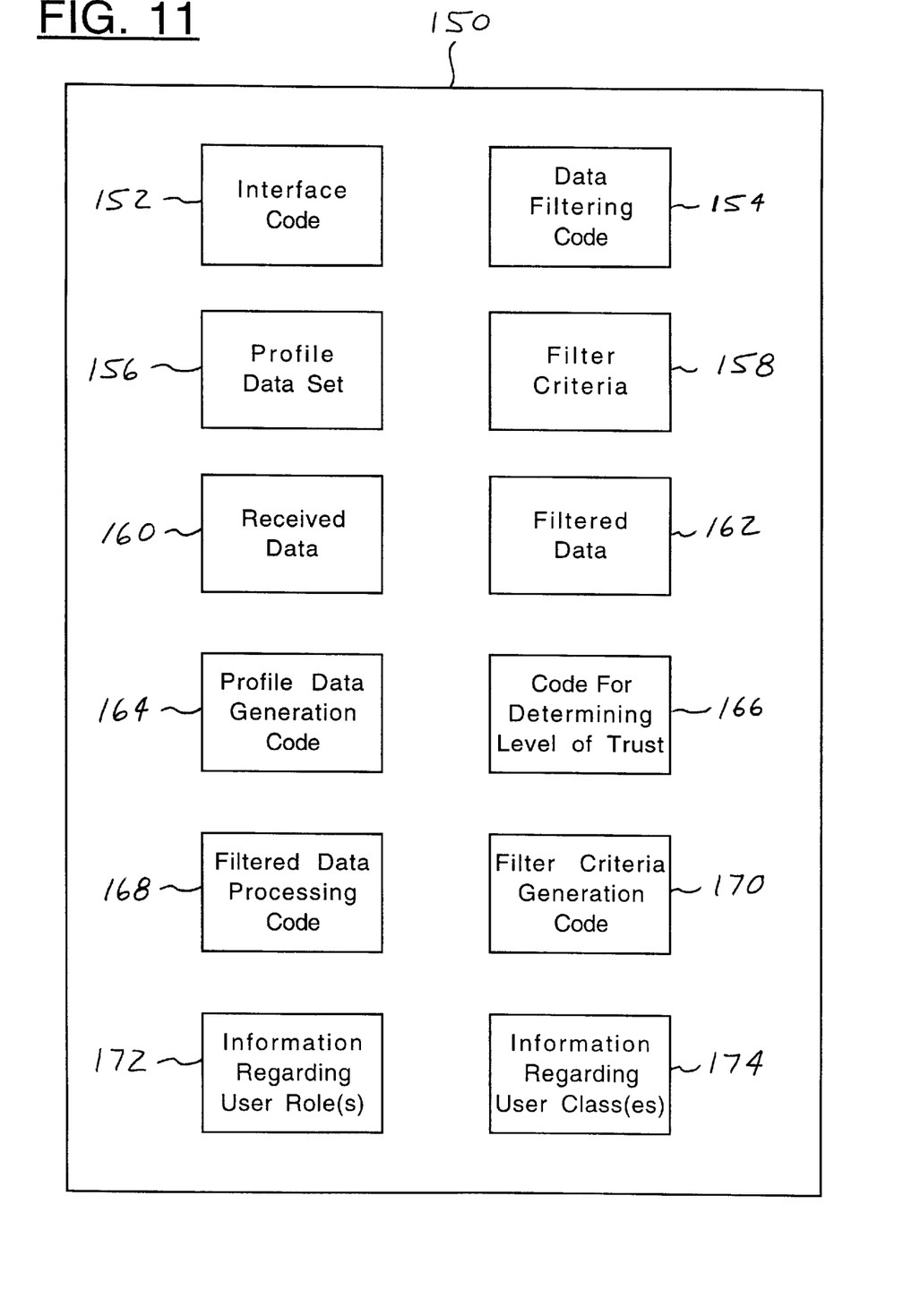
FIG. 11 illustrates an embodiment of a computer-readable medium containing various sets of instructions, code sequences, configuration information, and other data used by a computer or other processing device.

FIG. 11 illustrates an embodiment of a computer-readable medium 150 containing various sets of instructions, code sequences, configuration information, and other data used by a computer or other processing device. The embodiment illustrated in FIG. 11 is suitable for use with the data filtering system described above. The various information stored on medium 150 is used to perform various data filtering and data processing operations. Computer-readable medium 150 is also referred to as a processor-readable medium. Computer-readable medium 150 can be any type of magnetic, optical, or electrical storage medium including a diskette, magnetic tape, CD-ROM, memory device, or other storage medium.

Computer-readable medium 150 includes interface code 152 that controls the flow of information between various devices or components in a data filtering system. Interface code 152 may control the transfer of information within a device (e.g., between the processor and a memory device), or between an input/output port and a storage device. Additionally, interface code 152 may control the transfer of information from one device to another (e.g., the transfer of filtered data or profile data between a client and a server). Data filtering code 154 filters received data based on a particular filter criteria, as discussed above.

Computer-readable medium 150 also includes a profile data set 156 used to filter data and generate filter criteria. Profile data set 156 may include user-specific information, information related to user role(s), and/or information related to user class(es). Filter criteria 158 is used by the data filtering procedures described above. Received data 160 represents data that has been received by a particular device for filtering. Received data 160 may be filtered data from another device or may be unfiltered incoming data distributed by a third-party data source. Filtered data 162 represents the output of the data filtering process as applied to received data 160. If the filtering process filters out (i.e., removes) all received data 160, then filtered data 162 may be a null set.

Profile data generation code 164 typically resides on a client, and is used to generate profile data set 156. Profile data generation code 164 may be executed by a user of the client to generate or modify the various profile data attributes, values, and privacy characteristics contained in profile data set 156. Computer-readable medium 150 also includes code 166 for determining a level of trust associated with a particular device (such as a server). Typically, this code 166 is executed by a user of the client and may assign a default level of trust to a particular device if a level of trust is not otherwise assigned. For example, a default level of trust may be "untrusted," such that the device only receives profile data having a privacy characteristic of "Public."

Filtered data processing code 168 processes filtered data 162. For example, data processing code 168 may display filtered data 162 to a user, notify a user of the received data, or communicate filtered data 162 to the next device (e.g., transmit filtered data 162 from a server to a client). Filter criteria generation code 170 generates filter criteria based on information contained in profile data set 156 and the level of trust for a particular device as determined by code 166. Typically, filter generation code 170 is executed by a client, which generates a filter criteria for a particular device. The filter criteria contains the attributes and values from profile data set 156 that correspond to the level of trust associated with the particular device. For example, an untrusted server may only receive attributes and values having a privacy characteristic of "Public." Therefore, the filter criteria for an untrusted server will not contain attributes and values having a privacy characteristic of "Semi-Private" or "Private."

Computer-readable medium 150 also includes information 172 regarding user role(s) and information 174 regarding user class(es). As discussed above, information relating to user roles and user classes identify characteristics or attributes associated with roles or classes, rather than an individual person. As shown in FIG. 11, information 172 regarding user role(s) and information 174 regarding user class(es) may be stored separately from profile data set 156. In alternate embodiments, information regarding user role(s) and class(es) may be stored within profile data set 156.

FIG. 11 illustrates an exemplary computer-readable medium 150 containing various sets of instructions, code sequences, and other information that can be used by a data filtering system. However, in particular data filtering devices, one or more of the items illustrated in FIG. 11 may not be required. For example, in a computer-readable medium for use with an untrusted server that relies on a client for its filter criteria 158, the computer-readable medium need not contain profile data set 156, profile data generation code 164, code 166 for determining level of trust, filter criteria generation code 170, or information 172 and 174 regarding user role(s) and user class(es). In this example, the client maintains the profile data set, generates the filter criteria for the untrusted server, and communicates the filter criteria to the untrusted server. To maintain the privacy of the profile data set, the profile data set is typically stored only on the client.

Thus, a multi-stage data filtering system has been described that does not compromise a user's privacy. The system provides a filtering system that distributes multiple profile data elements to two or more data filtering stages, in which each data filtering stage may be performed by a different device or system.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of filtering data, the method comprising:
providing from a trusted second device, a first filter criteria to an untrusted first device, the first filter criteria being non-private filter criteria and determined at least in part on trustworthiness of the untrusted first device, wherein the untrusted first device uses the first filter criteria to filter data received by the untrusted first device and generate a first set of filtered data;
the trusted second device receiving the first set of filtered data from the untrusted first device; and
filtering by the trusted second device the first set of filtered data based on a second filter criteria, the second filter criteria determined at least in part on trustworthiness of the trusted second device, wherein the filtering of the first set of filtered data generates a second set of filtered data, wherein the second filter criteria is different from the first filter criteria.

2. The method of claim 1 wherein the first filter criteria and the second filter criteria contain different filter characteristics.

3. The method of claim 1 wherein the first filter criteria and the second filter criteria are included in a profile data set.

4. The method of claim 3 wherein the first filter criteria contains public profile data.

5. The method of claim 3 wherein the second filter criteria contains private profile data.

6. The method of claim 3 wherein the profile data set contains at least one data element associated with user-specific information.

7. The method of claim 3 wherein the profile data set contains at least one data element associated with a user class.

8. The method of claim 3 wherein the profile data set contains at least one data element associated with a user role.

9. A method of filtering data, the method comprising the steps of:
filtering data in an untrusted first data filtering device based on a first filter criteria from a trusted second device, determined at least in part on trustworthiness of the first untrusted data filtering device so that private filter criteria is not provided to the untrusted first data filtering device, the filtering generating a first set of filtered data; and
providing at least a portion of the first set of filtered data to a trusted second data filtering device to filter the first set of filtered data based on a second filter criteria.

10. The method of claim 9 wherein the step of filtering at least a portion of the first set of filtered data in the trusted second data device generates a second set of filtered data.

11. The method of claim 9 wherein the first filter criteria and the second filter criteria contain different filter characteristics.

12. The method of claim 9 wherein the first filter criteria and the second filter criteria are included in a profile data set.

13. The method of claim 12, in which the first data filtering device is untrusted such that the first filter criteria contains public profile data.

14. The method of claim 12 wherein the second filter criteria contains private profile data.

15. The method of claim 12 wherein the profile data set contains at least one data element associated with user-specific information.

16. The method of claim 12 wherein the profile data set contains at least one data element associated with a user role.

17. The method of claim 12 wherein the profile data set contains at least one data element associated with a user role.

18. A method of filtering data by an untrusted filtering device, the method comprising:
receiving a first filter criteria commensurate with the trustworthiness of the untrusted filtering device from a trusted data filtering device, the filtering criteria based at least in part according to trustworthiness of the untrusted filtering device and private filter criteria is not provided to the untrusted filtering device;
receiving incoming data from a data source;
filtering the incoming data using the first filter criteria to generate a first set of filtered data; and
providing the first set of filtered data to the trusted data filtering device, wherein the trusted data filtering device uses a second filter criteria based at least in part on trustworthiness of the trusted data filtering device to filter the first set of filtered data.

19. The method of claim 18 wherein the first filter criteria and the second filter criteria contain different filter characteristics.

20. The method of claim 18 wherein the first filter criteria and the second filter criteria are included in a profile data set.

21. The method of claim 20 wherein the second filter criteria contains private profile data.

22. The method of claim 21 wherein the method is performed by an untrusted filtering device.

23. A computer software product including a medium readable by a processor, the medium having stored thereon a sequence of instructions which, when executed by the processor of a trusted receiving device, cause the processor to:

provide to an untrusted first device from the trusted receiving device, a first filter criteria determined at least in part on trustworthiness of the untrusted first device, wherein the untrusted first device uses the first filter criteria to filter data received by the untrusted first device and generate a first set of filtered data;

the trusted receiving device receive the first set of filtered data from the untrusted first device; and filter the first set of filtered data based on a second filter criteria to generate a second set of filtered data, the second filter criteria determined at least in part on trustworthiness of the trusted receiving device, wherein the second filter criteria is different from the first filter criteria, and wherein the filter criteria of the untrusted first device is non-private filter criteria.

24. The computer software product of claim 23 wherein the first filter criteria and the second filter criteria are included in a profile data set.

25. The computer software product of claim 24 wherein the first filter criteria contains public profile data.

26. The computer software product of claim 24 wherein the second filter criteria contains private profile data.

27. A computer software product including a medium readable by a processor of an untrusted receiving device, the medium having stored thereon a sequence of instructions which, when executed by the processor, cause the processor to:

receive a first filter criteria determined at least in part on trustworthiness of the untrusted receiving device from a trusted data filtering device wherein the first filter criteria is non-private filter criteria;

receive incoming data from a data source;

filter the incoming data using the received first filter criteria to generate a first set of filtered data; and provide the first set of filtered data to the data filtering device, wherein the data filtering device uses a second filter criteria determined at least in part on trustworthiness of the trusted data filtering device to filter the first set of filtered data.

28. The computer software product of claim 27 wherein the first filter criteria and the second filter criteria contain different filter characteristics.

29. The computer software product of claim 27 wherein the first filter criteria and the second filter criteria are included in a profile data set.

30. The computer software product of claim 29 wherein the first filter criteria contains public profile data.

31. The computer software product of claim 29 wherein the second filter criteria contains private profile data.

32. A trusted data filtering apparatus comprising:

a data communication mechanism configured to provide a non-private filter criteria to an untrusted filtering device, wherein the untrusted filtering device uses the non-private filter criteria to generate a first set of filtered data, and wherein the data communication mechanism is further configured to receive the first set of filtered data from the untrusted filtering device; and a data filter configured to filter the first set of filtered data based on a private filter criteria, wherein the filtering of the first set of filtered data generates a second set of filtered data, wherein filtering criteria is configured at least in part according to trustworthiness of the untrusted filtering device so that private filter criteria is not provided to untrustworthy filtering devices.

33. The data filtering apparatus of claim 32 wherein the first filter criteria and the second filter criteria are included in a profile data set.

34. An untrusted data filtering apparatus comprising:

a data receiving mechanism configured to receive a first filter criteria from a trusted device and configured to receive incoming data from a data source;

a data filter configured to filter the incoming data using the first filter criteria and generate a first set of filtered data, the first filter criteria determined at least in part on the trustworthiness of the untrusted data filtering apparatus so that the untrusted data filtering apparatus does not receive private filter criteria; and a data transmitting mechanism configured to transmit the first set of filtered data to the trusted device, wherein the trusted device uses a second filter criteria commensurate with a trustworthiness of the trusted device to filter the first set of filtered data.

35. The data filtering apparatus of claim 34 wherein the first filter criteria and the second filter criteria are included in a profile data set.

36. The method of claim 1 further including determining the trustworthiness of the trusted device.

* * * * *